UNITED STATES PATENT OFFICE.

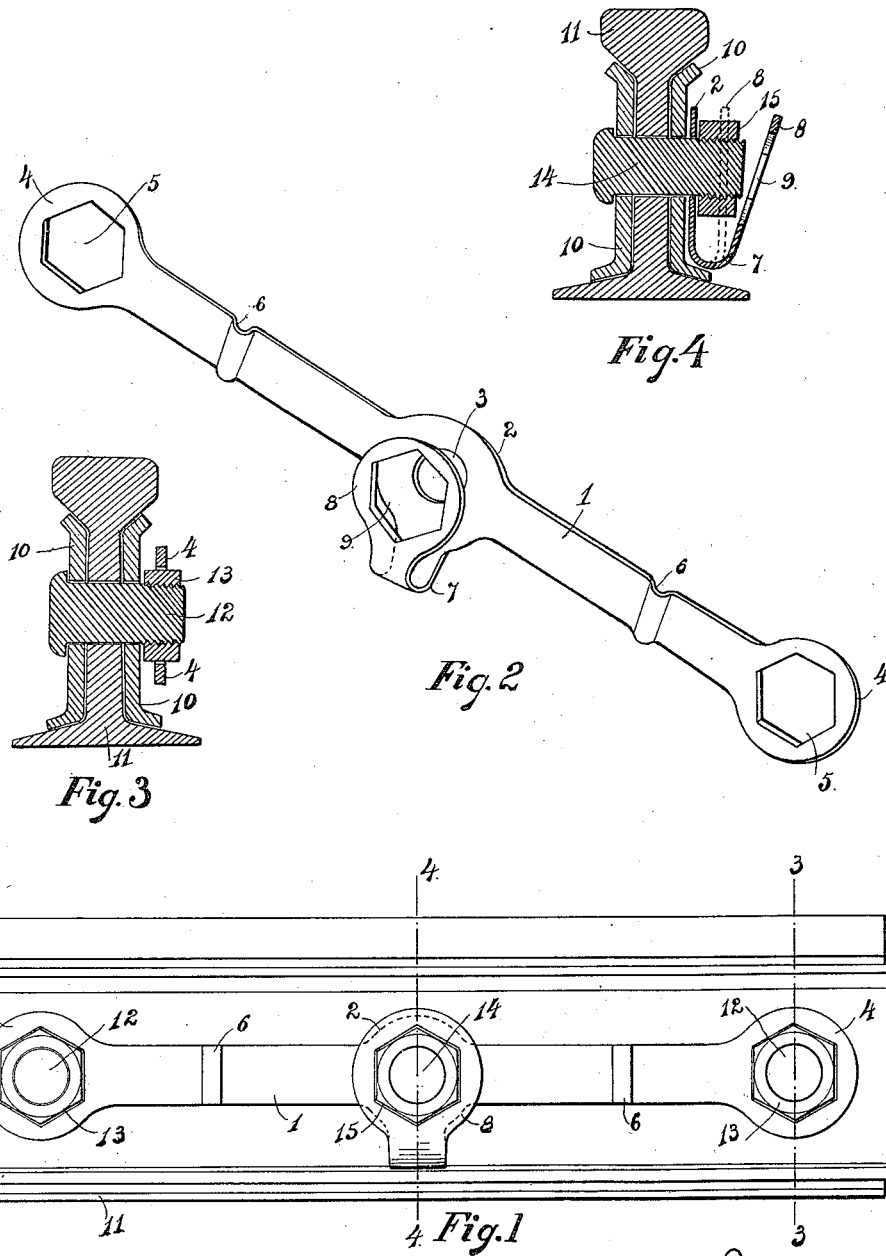

VICTORINO MARTINEZ, OF HABANA, CUBA.

NUT-LOCKING DEVICE.

1,064,977.  Specification of Letters Patent.  Patented June 17, 1913.

Application filed February 14, 1912. Serial No. 677,515.

*To all whom it may concern:*

Be it known that I, VICTORINO MARTINEZ, citizen of the Republic of Cuba, residing at Habana, Cuba, have invented certain new and useful Improvements in Nut-Locking Devices, of which the following is a specification.

This invention relates to devices for locking nuts.

One object of the invention is to provide a device for securing nuts against the vibratory motions that tend to displace them; it is also specially intended to obviate the loosening of the bolts used in the rail-plates fastening the adjacent sections of rails on the railway lines.

Another object is to provide a nut-locking device which will avoid the necessity, together with its contingent expense, of the upkeep of a body of men which all railroad companies have, up till now, been compelled to support, for the purpose of tightening, one by one, from time to time periodically, the innumerable nuts found throughout the length of the lines, which are perpetually loosened by the jarring of the heavy traffic.

This invention is described with reference to the figures of accompanying drawings in which identical parts are indicated by similar characters of reference, and of which:

Figure 1 is a front elevation of a section of rail with the coupling plates, showing a nut-locking device constructed according to this invention. Fig. 2 is a perspective view of this nut-locking device. Figs. 3 and 4 are vertical cross-sections, respectively on lines 3—3 and 4—4 of Fig. 1.

The nut locking device which is the object of the present invention, consists of a straight and narrow plate 1 made of cast iron or like material, having a central extension 2 in the form of a washer provided with a circular orifice 3 in its center, and having at each end an extension 4 also in the shape of a washer and provided with an angular orifice 5 in its center. Angular orifices 5 of extension 4 have a size and shape identical with the nuts which are destined to be locked firmly into position under the existing arrangement herein described, so as to conveniently fit into said angular apertures 5.

The straight plate 1 has undulating rigid portions at points 6 occurring at an approximately intermediate distance between the central extension 2 and the widened ends 4 with a purpose which will be hereafter explained.

The widened central portion 2 has at its lower edge a doubled over lug 7 in the form of a V and which terminates at its top in a widened portion in the form of a washer 8 provided with a polygonal aperture 9 the size of which is the same as that of the nuts, so that one of these may become incased in said aperture 9. The distance mediating between the center of the orifice 3 and the centers of the end openings 5 is equal to the distances between the centers of the orifices cut out in the rails and union plates for the passage of bolts. So as to bring into operation this tight-fastening device with the union plates of the rails of a railway, all that has to be done is to place plates 10 one at each side of the rail 11, passing then the bolts 12 through plates 10 and rail 11, at the same time screwing up the end nuts 13 upon said bolts 12. Then, once the central bolt 14 has been let into the respective holes of rail 11 and of union plates 10, the locking device or plate 1 is adjusted on the surface of the outer union plate 10, so that the end nuts 13 may be slipped into the polygonal end holes 5 of the said plate. To effect this satisfactorily, care must be taken that the position of these nuts shall agree with that of said holes 5 and also that central bolt 14 shall be made to pass through central hole 3 of plate 1. After this, central nut 15 is threaded on central bolt 14 and screwed down on to plate 1, and when said nut 15 is once in its proper position, the extended part 8 is compressed by means of a blow delivered upon it against the main body of plate 1, so that nut 15 may enter into hole 9 of said widened portion 8, until this comes into a position parallel with the central widened portion 2 of plate 1, and which is indicated by dotted lines in Fig. 4.

The polygonal form of openings 5 and 9 prevents the nuts 13 and 15 from unthreading off their respective screws and moreover the device remains solidly in position by means of central nut 15 which presses it against the outer union plate 10.

The rising curvature of plate 1 at points 6 has as its object to produce a predetermined lengthening or shortening of said plate 1, by respectively increasing or diminishing the amplitude of the undulating portions 6 with strokes of a hammer, when the centers of holes 5 may fail to exactly coincide with the center of the orifice of the union plates of rail.

What I claim as new is:

A nut locking device consisting of a straight and narrow plate provided with an extension at its central portion and an extension at each end thereof, these last mentioned extensions being in the form of washers, and the central extension provided with a circular hole adapted for the reception of a bolt, and each end extension having an angular aperture adapted for the incasing of a nut, the central extension being also provided with a lug adapted to be bent upon itself which terminates in a washer-like extension provided with a hole of an angular formation adapted to receive the nut which is to be screwed on the bolt passing through the circular hole of said central extension, and said plate having undulating rigid portions at points intermediate between central and end portions of same to produce a predetermined lengthening or shortening of said plate.

In testimony whereof I have hereunto set my hand in presence of two subscribing witnesses.

VICTORINO MARTINEZ.

Witnesses.
 RICARDO MORÉ,
 C. CHARTRAND.

---

Copies of this patent may be obtained for five cents each, by addressing the "Commissioner of Patents, Washington, D. C."